United States Patent [19]

Benoit et al.

[11] Patent Number: 5,095,659
[45] Date of Patent: Mar. 17, 1992

[54] AUTOMOBILE DOOR MODULAR ASSEMBLY

[75] Inventors: Dominique Benoit, Aurora; Jonathan Vinden, Mississauga, both of Canada

[73] Assignee: Atoma International, A Magna International Company, Newmarket, Canada

[21] Appl. No.: 346,882

[22] Filed: May 2, 1989

[51] Int. Cl.$^5$ .................................................. B60J 5/04
[52] U.S. Cl. .......................................... 49/502; 49/503; 49/394; 49/374; 292/141; 292/DIG. 31; 296/146
[58] Field of Search .................. 49/502, 503, 501, 460, 49/374, 351, 294, 394; 292/141, 357, 336.3, DIG. 31, DiG. 53, DIG. 54, DIG. 64; 16/124; 296/146; 362/80, 145

[56] References Cited

U.S. PATENT DOCUMENTS

| | | | |
|---|---|---|---|
| 2,159,532 | 5/1939 | Prance | 362/80 |
| 2,507,328 | 5/1950 | Ashley | 292/141 X |
| 2,598,670 | 6/1952 | Bentley | 292/141 |
| 2,650,857 | 9/1953 | Watter | 296/44 |
| 2,750,217 | 6/1956 | Landholt | 292/DIG. 31 X |
| 2,760,814 | 8/1956 | Watter | 296/44 |
| 3,250,558 | 5/1966 | McClintock | 292/DIG. 31 X |
| 3,258,877 | 7/1966 | Peras | 49/502 |
| 3,508,78 | 4/1970 | Legge | 292/DIG. 31 X |
| 3,678,635 | 7/1972 | Vagi | 362/80 X |
| 3,700,076 | 10/1972 | Forsting et al. | 188/1 C |
| 3,782,036 | 1/1974 | Clark et al. | 49/502 |
| 3,791,693 | 2/1974 | Hellriegal | 296/146 |
| 3,829,149 | 8/1974 | Stevens | 296/28 R |
| 3,868,141 | 2/1975 | Johnson | 296/28 R |
| 3,874,119 | 4/1975 | Renner et al. | 49/502 |
| 3,883,171 | 5/1975 | Bauer | 296/28 R |
| 3,887,227 | 6/1975 | Deckert | 296/28 R |
| 3,907,358 | 9/1975 | Barenyi et al. | 296/146 |
| 3,936,090 | 2/1976 | Aya et al. | 296/146 |
| 3,938,288 | 2/1976 | Roubinet | 52/615 |
| 4,013,317 | 3/1977 | Reidelbach et al. | 296/146 |
| 4,018,475 | 4/1977 | Richtermeier | 296/28 R |
| 4,056,280 | 11/1977 | Bauer et al. | 296/146 |
| 4,090,734 | 5/1978 | Inami et al. | 296/146 |
| 4,105,243 | 8/1978 | Geiger | 296/28 R |
| 4,196,929 | 4/1980 | Bauer | 296/31 R |
| 4,290,235 | 9/1981 | Jahnle et al. | 49/502 |
| 4,290,641 | 9/1981 | Miyauchi et al. | 296/146 |
| 4,300,315 | 11/1981 | Holzwarth | 49/501 |
| 4,306,381 | 12/1981 | Pizesto | 296/146 X |
| 4,307,911 | 12/1981 | Pavlik | 296/188 |
| 4,328,642 | 5/1982 | Presto | 49/502 |

(List continued on next page.)

FOREIGN PATENT DOCUMENTS

| | | |
|---|---|---|
| 617915 | 4/1961 | Canada . |
| 988124 | 4/1976 | Canada . |
| 0061131 | 9/1982 | European Pat. Off. . |
| 0072537 | 2/1983 | European Pat. Off. . |
| 0077401 | 4/1983 | European Pat. Off. . |
| 0099119 | 1/1984 | European Pat. Off. . |
| 0127591 | 5/1984 | European Pat. Off. . |
| 0119775 | 9/1984 | European Pat. Off. . |
| 0131193 | 1/1985 | European Pat. Off. . |
| 0148987 | 7/1985 | European Pat. Off. . |
| 3520479 | 10/1986 | Fed. Rep. of Germany . |
| 2101535 | 1/1983 | United Kingdom . |
| 2117329 | 10/1983 | United Kingdom . |
| 2149726 | 6/1985 | United Kingdom . |

Primary Examiner—Gary L. Smith
Assistant Examiner—Jerry Redman
Attorney, Agent, or Firm—Nixon & Vanderhye

[57] ABSTRACT

A vehicle door comprising a door shell, a module, and door hardware components attached on the door module. The door shell comprises an outer belt reinforcement, an outer panel and an inner panel having a hinge and a latch member. The module comprises a core member having two metal plates thereby to receive the hardware components. The hardware components which are attached to the module are an exterior door release, an interior door release, a latch mechanism, a window regulator mechanism, and a trim panel. Thus, the module is adapted to permit pre-assembly and pre-testing of major sub-assemblies.

13 Claims, 14 Drawing Sheets

U.S. PATENT DOCUMENTS

| | | | |
|---|---|---|---|
| 4,369,608 | 1/1983 | Miura et al. | 52/309.9 |
| 4,378,395 | 3/1983 | Asoshina et al. | 428/158 |
| 4,397,914 | 8/1983 | Miura et al. | 428/43 |
| 4,405,173 | 9/1983 | Piano | 296/146 |
| 4,416,088 | 11/1983 | Feucht et al. | 49/502 |
| 4,420,954 | 12/1983 | Hieronymi | 292/DIG. 31 X |
| 4,428,157 | 1/1984 | Engelsberger et al. | 49/502 |
| 4,434,580 | 3/1984 | Engelsberger et al. | 49/502 |
| 4,451,518 | 5/1984 | Miura et al. | 428/137 |
| 4,488,751 | 12/1984 | Kling | 296/146 |
| 4,491,362 | 1/1985 | Kennedy | 296/1983 |
| 4,512,240 | 4/1985 | Mahler et al. | 98/2.04 |
| 4,561,211 | 12/1985 | Raley et al. | 49/374 |
| 4,575,967 | 3/1986 | Bickerstaff | 49/211 |
| 4,603,894 | 8/1986 | Osenkowski | 296/146 X |
| 4,648,208 | 3/1987 | Bawamus | 49/502 |
| 4,651,470 | 3/1987 | Imura et al. | 49/502 |
| 4,662,115 | 5/1987 | Ohya | 49/503 X |
| 4,691,476 | 9/1987 | Yao et al. | 49/374 |
| 4,695,499 | 9/1987 | Whitener | 428/122 |
| 4,704,822 | 11/1987 | Srock | 49/502 |
| 4,785,585 | 11/1988 | Greir | 49/502 |
| 4,827,671 | 5/1989 | Herringshaw | 49/502 X |
| 4,907,836 | 3/1990 | Ueda | 49/502 X |

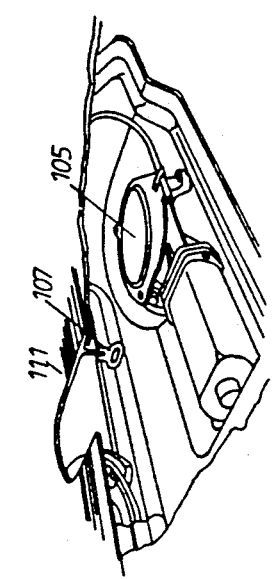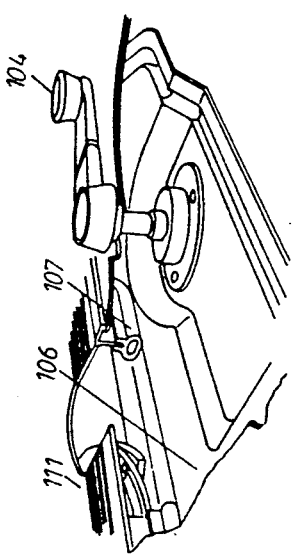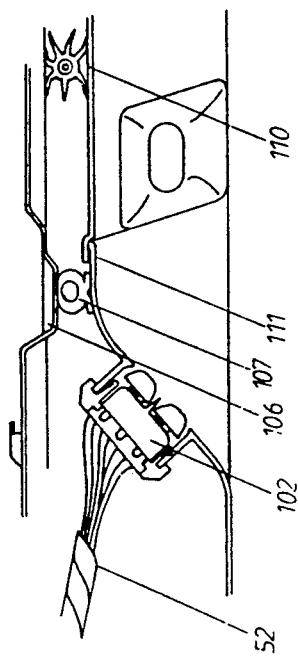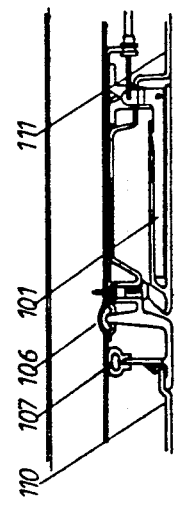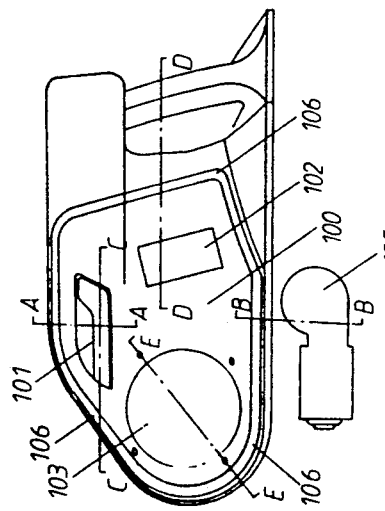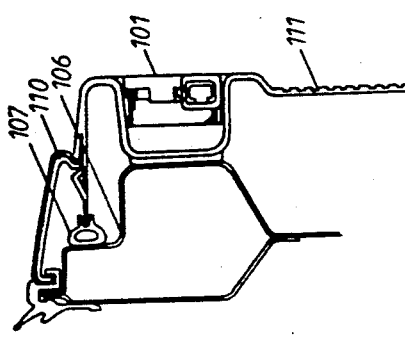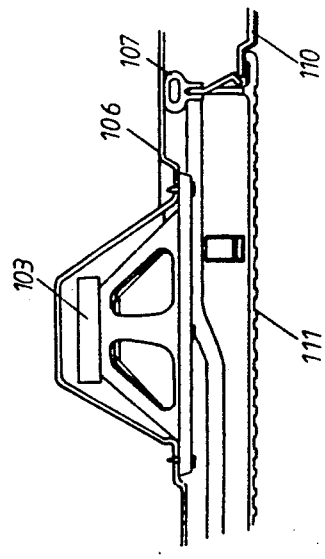

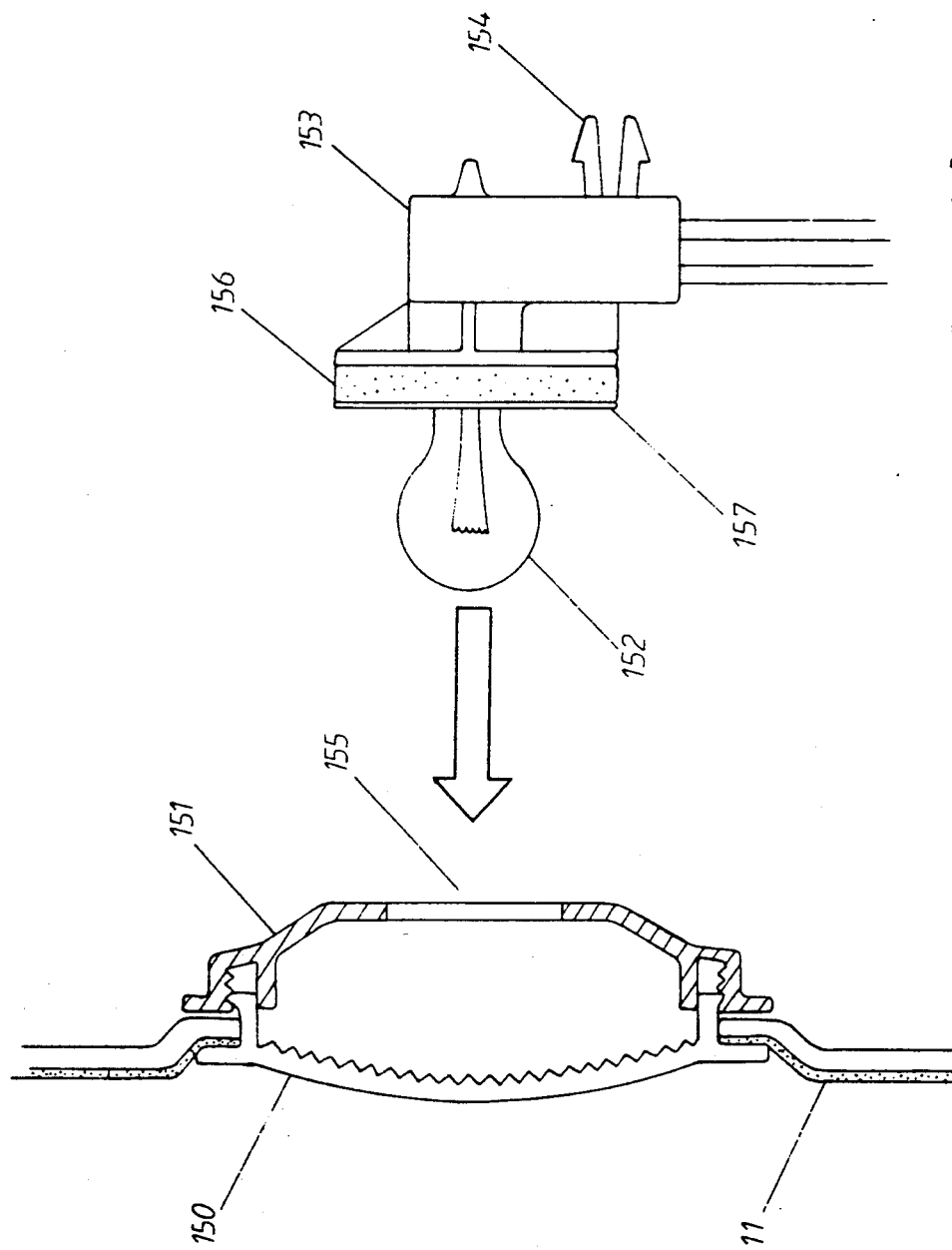

AUTOMOBILE DOOR MODULAR ASSEMBLY

FIELD

This invention relates to an automobile door. In particular, it relates to an automobile door having modular components adapted to permit pre-assembly and pre-testing of major sub-assemblies.

BACKGROUND OF THE INVENTION

In recent years there has been an accelerating trend toward more automation in the manufacture and assembly of automobiles. Accordingly, the engineering of automobile components is becoming increasingly directed by design for assembly (DFA) principles which predicate the development of modular components which can be pre-tested and pre-assembled before installation in a car.

It is an object of the present invention to provide a design for a vehicle door which can be used on a complete range of vehicles from passenger cars to trucks and, in particular, will permit modern features such as flush-mounted window glass and other current styling treatments.

It is also an object of this invention to provide a door design which will reduce end-unit assembly cost without compromising quality.

It is an object of this invention to provide a hardware module which will provide functionality and structural performance similar to that available with other conventional designs.

It is also an object of this invention to provide a door which provides easy access to the interior of the door for installation of window seals, glass and other hardware.

It is an object of this invention to provide an exterior door handle which can be installed from the interior of the car door.

It is also an object of this invention to provide a door hardware module which permits pre-assembly of major door installation aggregates and pre-testing of same.

It is an object of this invention to provide cable actuated exterior door release and snap in lock cylinder assembly.

It is an object to provide a door hardware module which has a plug-in wire harness to provide electricity for the powered hardware components.

It is an object of this invention to provide an improved sealing means to segregate "wet" and "dry" components in the hardware module.

SUMMARY OF THE INVENTION

(a) General Description

The present invention is an automobile door comprising a door shell having an outer belt reinforcement member; an outer panel; and an inner panel including a hinge member and a latch member; a module adapted to contain all door hardware including an inner belt reinforcement member, an exterior door release, an interior release, a latch mechanism, a window and window regulator mechanism and wire harness; and a trim panel including bezels.

The module of this invention is adapted to be installed, from the inside, into the door shell and to be fastened therein to locate all the hardware components in the door. It is preferred that the module have a core comprising two overlapping metal plates adapted with receptacles to receive the hardware components, each such plate having a partial box section inverted and opposed to the other to form the inner belt reinforcement member.

The module has two embodiments of the exterior door release. The first embodiment is an exterior door release separate from the core of the module which is adapted to be installed from inside the door shell and to be connected by actuating cables to a latch mechanism mounted on the module core. The second embodiment is an integrally mounted exterior door release also adapted to be installed from inside the door shell and connected by actuating means to a latch mechanism mounted on the module. The actuating means for the integrally mounted door release can be either rods or cables.

The outer panel has an opening adapted to receive the exterior release and is reinforced about the opening by a flange extending from the door shell. The flange provides a base upon which the exterior release can be fastened. The exterior release can be contained in a housing having a first portion adapted to be inserted under a first portion of the flange and having a second portion adapted to be fastened to the flange to secure the exterior release in the opening. In one embodiment the housing has an upward extension adapted to be inserted under a depending lip of the flange and an inward extension adapted to be fastened onto an inward extending ledge of the flange to secure the exterior release in the opening. In a preferred embodiment the housing is adapted to be fastened by a downwardly biased ratchet cam rotatably mounted on the housing. The cam is adapted to rotate into and to connect with an opening in the inward extending ledge of the flange to secure the exterior release in the opening.

(b) The Outer Belt Reinforcement Member

It will be appreciated that the flange supporting the exterior release can extend about the opening from virtually any structural member of the door shell. It is preferred, however, in the present invention, that the outer belt reinforcement member be provided as a separate inner panel section which can be installed into the remainder of the door shell during assembly prior to the installation of the module. The outer belt reinforcement section can have a depending cantilever flange adapted to be bonded to the outer panel inside and about the opening for the exterior release. In one embodiment, the frame of the inner panel is driven outward at the belt line and back parallel to the outer panel to form the end portions adapted to receive the outer belt reinforcement section. In another embodiment, the inner panel continues parallel to the outer panel to form the end portions, but the outer belt reinforcement section bends back up on itself to be spot welded to the outside surfaces of the end portions. This latter embodiment provides for more space along the inner door panel perimeter for attaching other things like the vapour seal and the trim panel.

(c) The Hardware Module

In order to effect easy assembly of the hardware components on the production line of an automobile factory, it is desirable to have access to the inside of the door through the inner panel of the door. For example, in the 1987-1988 BMW 700 series cars, a large cut out is provided in the inner panel below the conventional inner and outer belt reinforcement sections to permit installation of the hardware. However, notwithstanding the large cut out provided, it is still necessary to fish the window glass through the slot between the inner and outer panels, thereby complicating the assembly process. The design for assembly approach is facilitated in this invention by incorporating the inner belt reinforcement in the removable hardware module which contains the window and window regulator and other components as described above.

The hardware module core can be made from preferably two metal plates which are welded together and appropriately stamped and fitted to receive the components of the module. It will be appreciated that the module could be fabricated from one stamping or more than two, depending on the structural requirements. The core panel is designed to extend down from the belt line. An inner belt reinforcement member can be fabricated onto the core panel, for example by spot welding inverted and opposite box sections onto the panel. Both parts of the inner belt reinforcement member can be stamped from sheet steel, box sectioned and attached along the inner belt line to provide a light weight, yet stiff structure which has the required stiffness to pass crush tests.

Mechanical fasteners can be used to attach the hardware module to the door shell. The module provides the additional structure required to give integrity to the construction of the door.

The hardware module of this invention incorporates virtually all the door hardware components. The exterior handle is presented in two embodiments, one in which it is incorporated with the hardware module, the other in which it is a separate but an attached part. In both embodiments, hardware components such as a window regulator and interior release handle are incorporated directly into the module, thus eliminating the duplication of materials and reducing the overall costs of the door. Components such as the speaker, latch, wiring harness and latch power actuator are bolted or clipped to the module.

It is a novel feature of this invention that the exterior door release is mounted from the interior of the door. In one embodiment, the door release mechanism is integral to the hardware module and installed from the interior of the door. In a second embodiment, a complete exterior release and handle is attached to the hardware module by actuating cables and the complete unit is installed from the interior side of the door.

It will be appreciated by those skilled in the art that this novel installation will provide many advantages in the line assembly operations. Most exterior releases in use today are installed from outside the vehicle. Exterior installation requires rods to be added between the exterior release/lock cylinder and latch. Since most doors have a substantial inner panel perforated with cut outs, attachment of these rods tends to be somewhat awkward. The present invention simplifies installation of the exterior handle substantially. It will also be appreciated that a cosmetic door handle can be affixed to the release mechanism from the exterior of the door to obtain colour coordination or other effects while still enjoying the benefits of this invention. Moreover, by incorporating the release mechanism in the hardware module the entire latch function can be adjusted and tested before it reaches the assembly line for installation in the door.

The opening for the exterior release can be provided with an inward facing stiffening lip which is bent into the exterior sheet metal about the periphery of the hole in the panel. This feature improves the accuracy of the cut out as well as providing a location position for the handle. A rubber gasket is fitted about the stiffening lip to seal the handle insert and to reduce vibration noise. The handle insert can be preferably a die cast or plastic housing. The rubber gasket lies about the lip between the sheet metal and the housing. A groove in the gasket is adapted to be deep enough to accept variances in the lip depth. The housing extends upwardly and downwardly past the rubber gasket. A depending cantilevered flange can extend from the outer belt reinforcement box section behind and about the hole in the exterior panel and can be fixed to the inside of the outer panel by suitable fastening means such as an adhesive. The upper projecting portion of the handle housing is adapted to fit under the upper portion of the depending cantilevered flange in a spring fit which presses the upper portion of the housing towards the outer panel onto the rubber gasket. The lower end of the housing can be fastened by a bolt or other suitable fastening means to the lower portion of the depending cantilevered flange to secure the housing in place.

The window regulator hardware can be any of a number of conventional systems but preferably is an X-arm type which can be riveted directly to the hardware module. Because the window regulator is integral with the hardware module, the guidance slot that typically is an extra piece can be stamped from the hardware module itself. The roller that moves within the guide can be pre-installed onto the X-arm and inserted through an enlarged end of the slot at the time of assembly. The window regulator mechanism can be a power or manual type without departing from the scope of this invention.

A pocket stamped into the sheet metal of the module accommodates the window regulator motor, keeping the overall height of the hardware module to a minimum. The pocket in the sheet metal also provides support for the motor during door closing and opening as well as providing protection against water.

It is possible to hang the body of the motor outside the confines of the sheet metal, however, this reduces packaging efficiency for an application where hardware modules are supplied, assembled and pre-tested directly to the manufacturer.

The hardware module can accept most conventional latch designs. The latch can be attached to the hardware module by a single rivet, but when the hardware module is installed into a door it can be fastened to the door mounting by means of mechanical fasteners. A power door lock actuator can be integral with the latch, or separate and attached to the hardware module inner belt portion. In the latter case, a rod can be used to connect the latch to the lock actuator button. The entire latch system can be fully tested prior to shipment of the hardware module to the final assembly facility.

The interior release can be installed onto the hardware module utilizing pivot points stamped directly from the hardware module sheet metal, thus eliminating additional components. Tension rods can be used in conjunction with the interior release and can be easily installed onto the hardware module before the module is installed in a door, thus eliminating the major drawback of fishing odd-shaped rods through blind holes as the door is moved down the line during assembly. It will be apparent to those skilled in the art, that depending on manufacturing requirements, the "push to release" (compression) rods or "pull to release" cables can be used.

The interior release handle can be a modified "hockey stick" type to provide easy installation through an opening in the trim bezel.

A stamped recess in the hardware module carrier plate accommodates currently available speakers. By adding this speaker to the hardware module rather than the trim panel, installation of the wiring harness is simplified. The steel of the hardware module also provides a secure, protecting mounting surface and protection against water. The speaker is most easily installed prior to the installation of the trim panel. However, it remains accessible with the trim panel installed and the bezel removed.

Rather than incorporating a courtesy lamp within the trim panel, necessitating an electrical connection to the trim panel from the wiring harness, the design of this invention places only the lens and the reflector in the trim panel. The bulb and the bulb holder are separately mounted to the hardware module. This design provides an opportunity to test the entire wiring harness and the lamp prior to shipment of the hardware module to the vehicle assembly facility.

Any reasonable dimensional differences between the hardware module and the trim panel can be accommodated by using an oversized hole in the back of the reflector through which the bulb fits. A foam pad with a silver reflective material on the bulb side acts as an anti-rattle padding and dust and moisture seal between the lamp socket and the reflector and lens.

A lens and reflector for the courtesy lamp are supplied to the assembly plant installed into the trim panel. Access to change a defective bulb remains simple, however, as the lens and reflector can easily be snapped out of the trim panel.

The wiring harness necessary to provide power to the components of the hardware module is provided on the hardware module as well. It is adapted to extend from the module through the perimeter of the door on the hinge member to be plugged into a socket in the car body. This feature of consolidating the complete wire harness onto the hardware module eliminates the cost of additional connectors, facilitates checking and testing of components prior to assembly. Reduction of connectors reduces costs and the likelihood of electrical failure due to corrosion of same.

The conduit for the wiring harness is provided with a sealing means where it crosses the perimeter of the door and penetrates the seal line.

The hardware module is also provided with a area adapted to contain the "dry" components of the hardware such as the interior door handle, the speaker and electrical switches for power window regulator and door locks. The perimeter of this area is adapted to attach a sealing membrane. In one embodiment, conventional polyethylene sheeting is attached about the dry area perimeter and to the perimeter of the inner door panel to effect the sealing of "wet" from "dry" zones. In another embodiment, the vapour seal is provided by the trim panel itself. In this embodiment, a sealing bead, lip or other suitable sealing means is provided about the dry area perimeter and about the surface of the inner panel upon which the trim panel and its concomitant bezel rest to obtain the required vapour seal when the trim panel is attached. This embodiment obviates the need for the vapour barrier sheeting and the cumbersome step of handling the sheeting and adhesive on the assembly line. It also permits the door to be opened up for repair and re-closed with a proper seal without having to reseal it with vapour barrier.

In providing a hardware module which contains an exterior release there is the problem that each car will receive at least two such modules which both must lock and unlock with the same key. The problem of producing two matched modules and keeping them matched until installation in one car is an onerous one, particularly if pre-testing is contemplated.

The present invention avoids that problem by having snap in lock cylinders which are installed in the car on the assembly line after the modules have been installed in the cars. In this way, the modules can be installed without concern as to matching locks and keys. This matching can be done after the car is built.

The hardware module has a receptacle adapted to receive the lock cylinder in snap fit connection. A spring clip retainer is provided within the lock receptacle adapted to snap fit about a retainer cap which fits over and secures the lock cylinder.

BRIEF DESCRIPTION OF THE DRAWING

In the figures which describe the preferred embodiments of this invention:

FIGS. 13A–G illustrates details of a dry well in the module with various sectional views of components.

FIGS. 14A and 14B is an illustration of the courtesy lamp of this invention.

DESCRIPTION OF THE PREFERRED EXEMPLARY EMBODIMENTS

Figure 1:
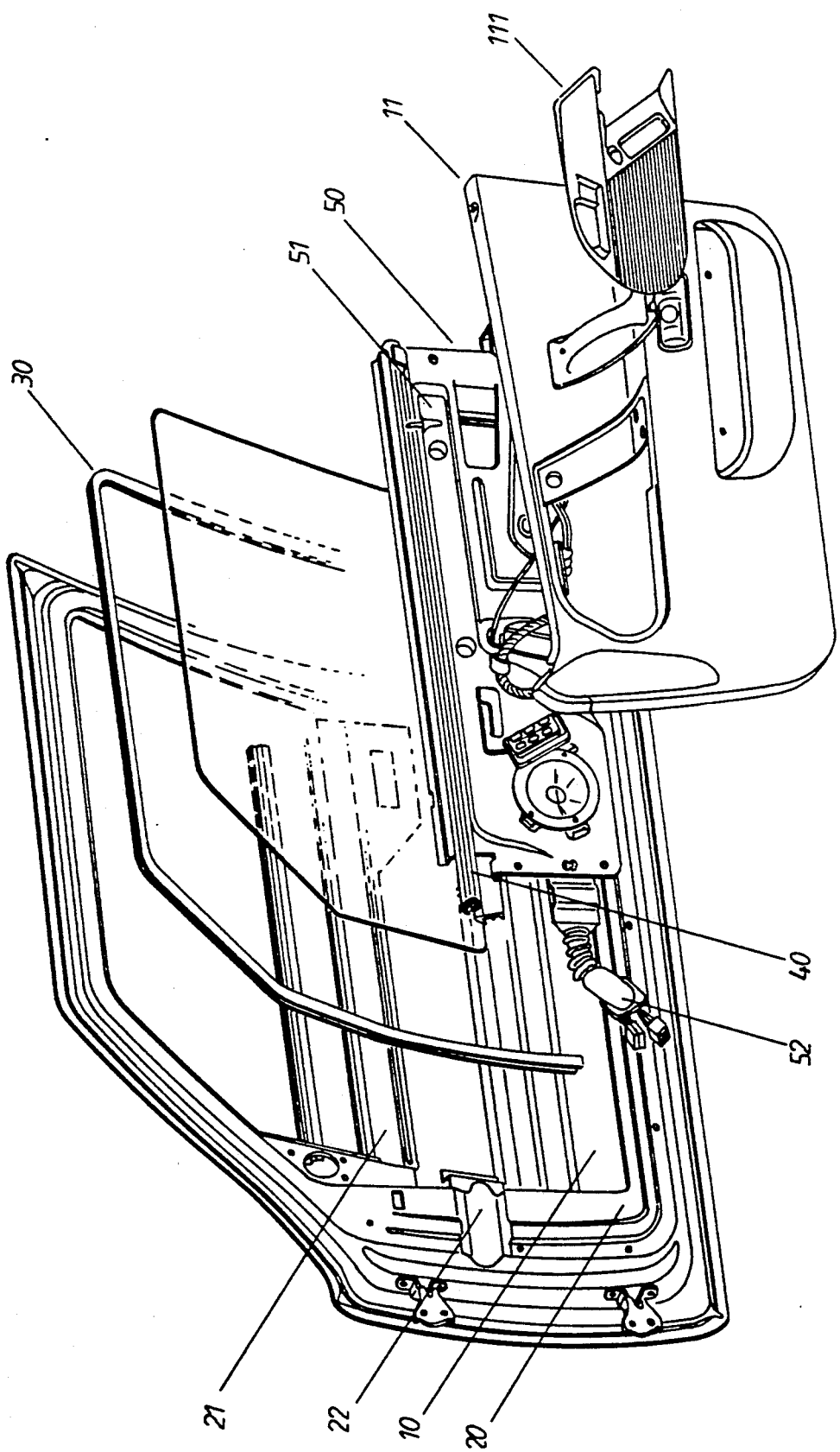
FIG. 1 is an exploded view of a preferred embodiment of the automobile door of this invention.

In FIG. 1, the general configuration of a preferred embodiment of this invention is illustrated in an exploded view of a front door. The outer panel (10) is a conventional one piece stamped steel outer panel hemmed and spot welded to a two piece inner panel comprising the perimeter section (20) and outer reinforcement section (21). Glass run (30) is adapted to be attached in a conventional manner. A water shield (40) is shown rolled up before assembly. After assembly, it is unrolled to provide a vapour barrier for the door. The hardware module (50) of this invention is shown to contain the hardware components of the door and includes an inner belt line reinforcement section (51). The wiring harness (52) is shown extending out of the hardware module (50) and is adapted with an extendable cord to extend through slot (22) in the perimeter inner panel section (20) and to plug into a socket (not shown) in the car body. The trim panel (11) is adapted to be fastened over the hardware module (50) and the water shield (40).

Figure 2:
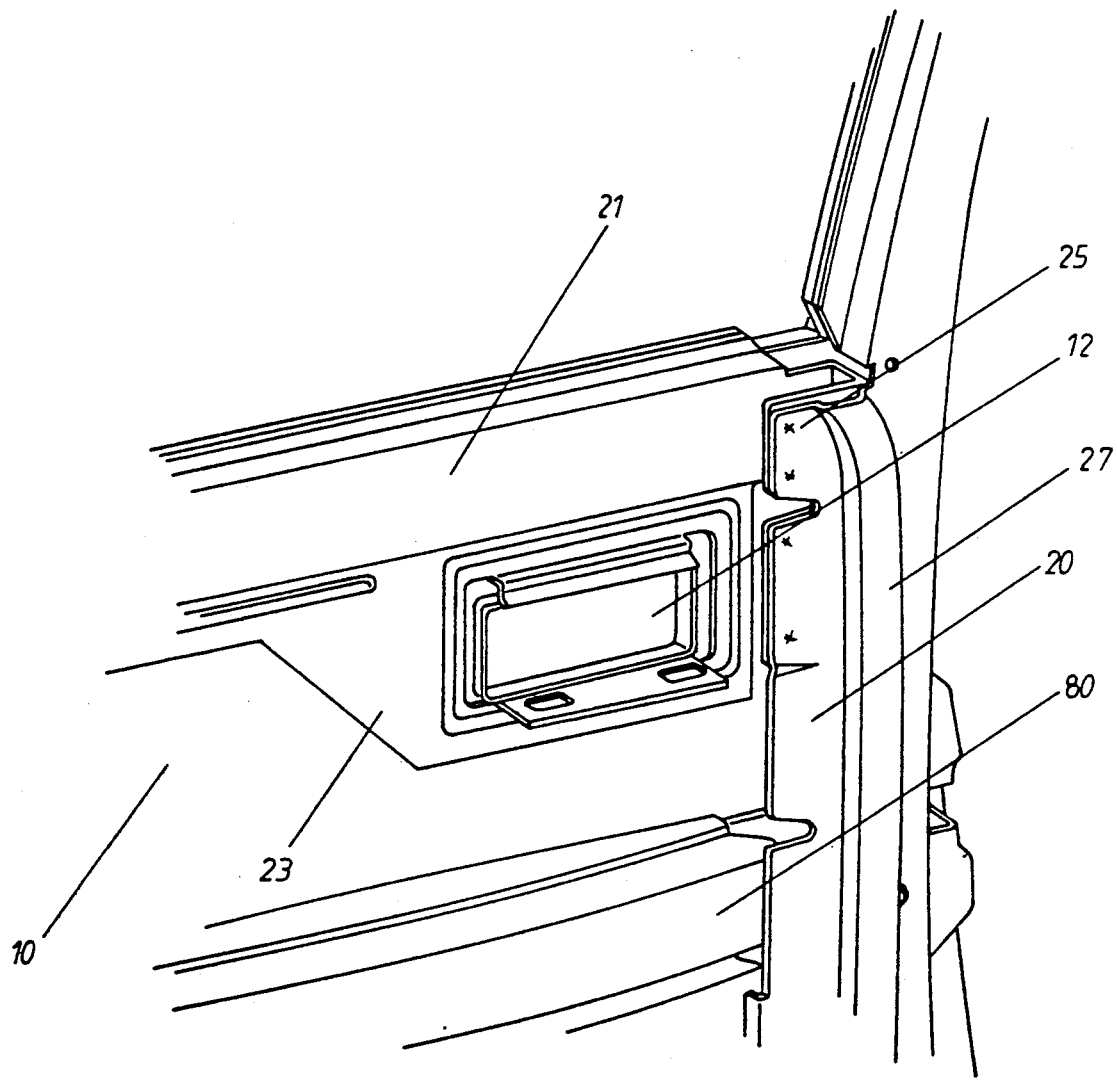
FIG. 2 is a detail of the rear outer belt reinforcement fastening ledge.

In FIG. 2, one embodiment of the outer belt reinforcement section (21) is illustrated spot welded in place to the inner panel perimeter section (20). Outer belt reinforcement section (21) has depending from it a flange (23) which is adapted to surround the exterior release opening (12) in the outer panel (10). Flange (23) is adapted to reinforce the outer panel (10) about the exterior release opening and to provide a support for the exterior release mechanism of the hardware module (50).

It will be appreciated that a similar flange could be extended from the intrusion beam (80) or from the perimeter inner panel section (20) to provide the support required around the exterior release opening (12) in the outer panel (10).

In an embodiment of the outer belt reinforcement section (21) shown in FIG. 2, the inner panel perimeter section (20) continues in the same plane to form the fastening ledge (25). The outer belt reinforcement section (21) is bent back upon itself at its ends and spot welded to the outside of the ledges (25). The enlarged inner panel flange (27) found in this embodiment provides greater area for attachment of vapour barrier and trim panel detail (not shown in FIG. 2).

Figure 3:
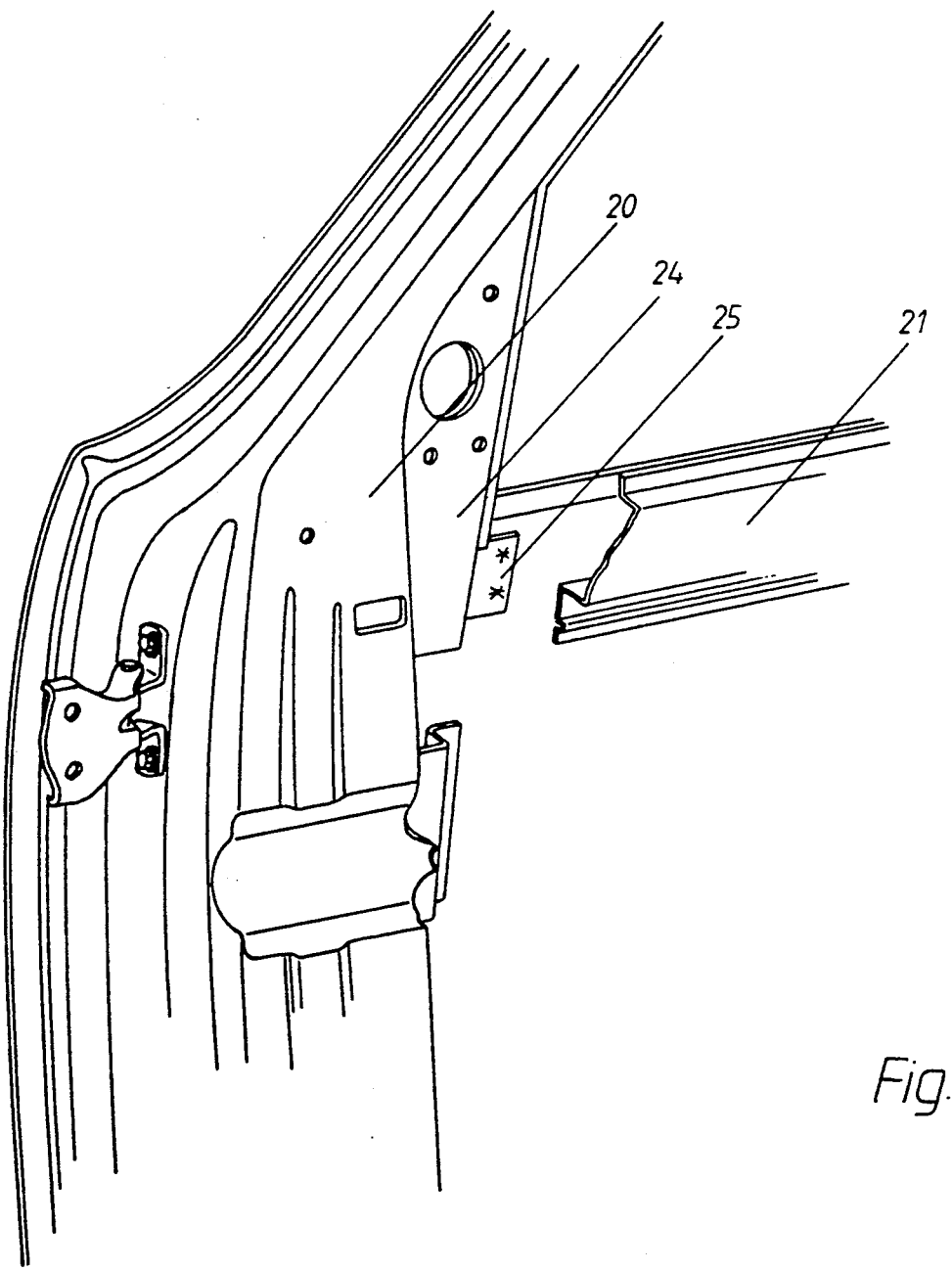
FIG. 3 is a detail of the front outer belt reinforcement fastening ledge.

At the front of the door, shown in FIG. 3, the inner panel perimeter section (20) is driven outwardly below the window opening at position (24) and then bent back parallel to the plane of the outer panel (10) to form a fastening ledge (25) upon which the outer belt reinforcement section (21) is attached.

Figure 4:
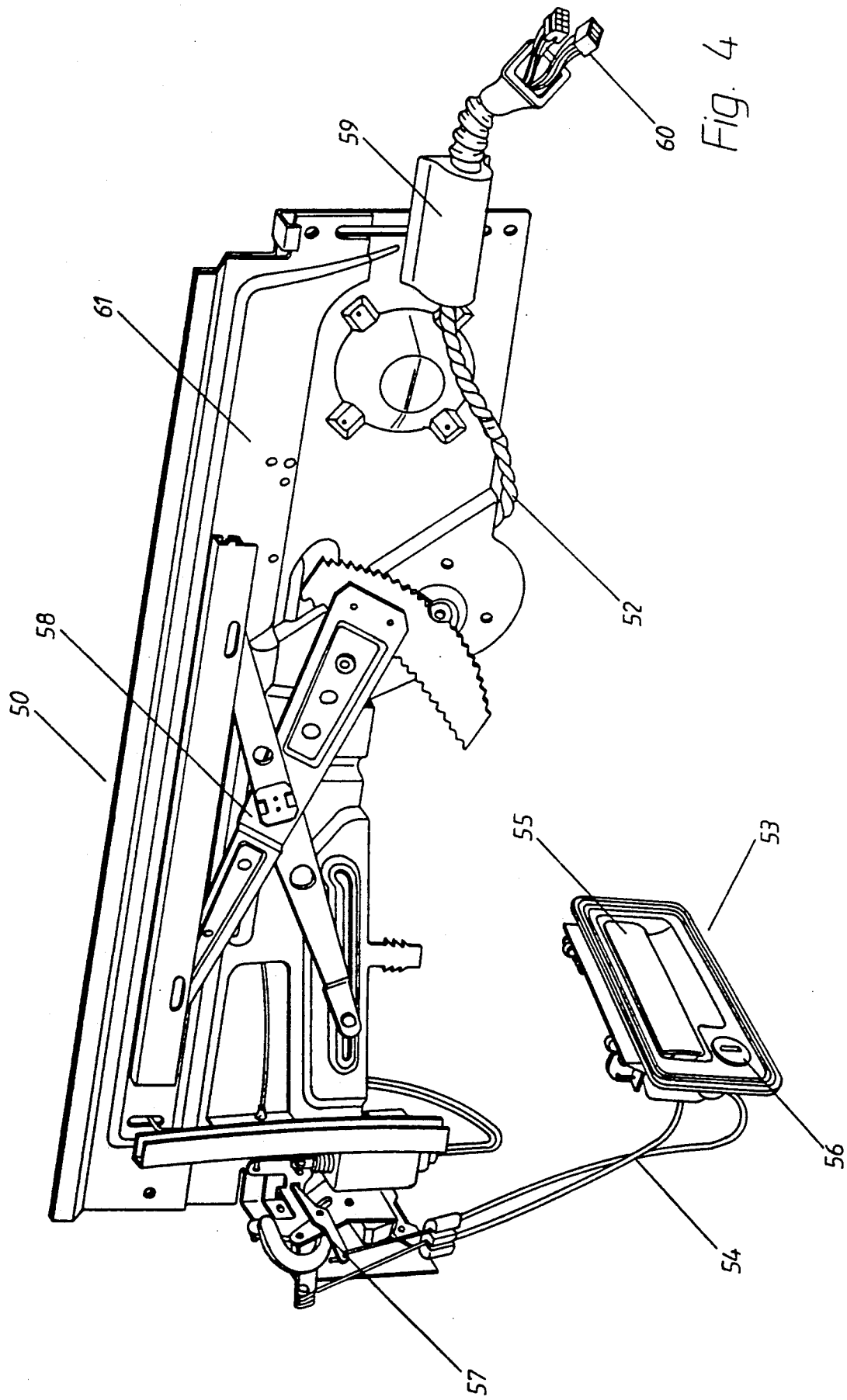
FIG. 4 is an illustration of a complete hardware module of this invention.

One embodiment of a hardware module (50) of this invention is shown in FIG. 4 having an exterior release mechanism (53) attached to the module (50) by cables (54) which transmit the loads from the handle (55) and the lock cylinder (56) to the latch mechanism (57). The window regulator mechanism (58) is a conventional X-type mechanism. The wiring harness (52) extends from the module through a soft rubber or plastic grommet (59) which is adapted to seal and protect the harness at the door perimeter where it passes through slot (22). The harness (52) terminates in a plug (60) adapted to be plugged into an electrical socket in the car body. Alternately, conventional wiring harness means may be employed in this combination.

Figure 5:
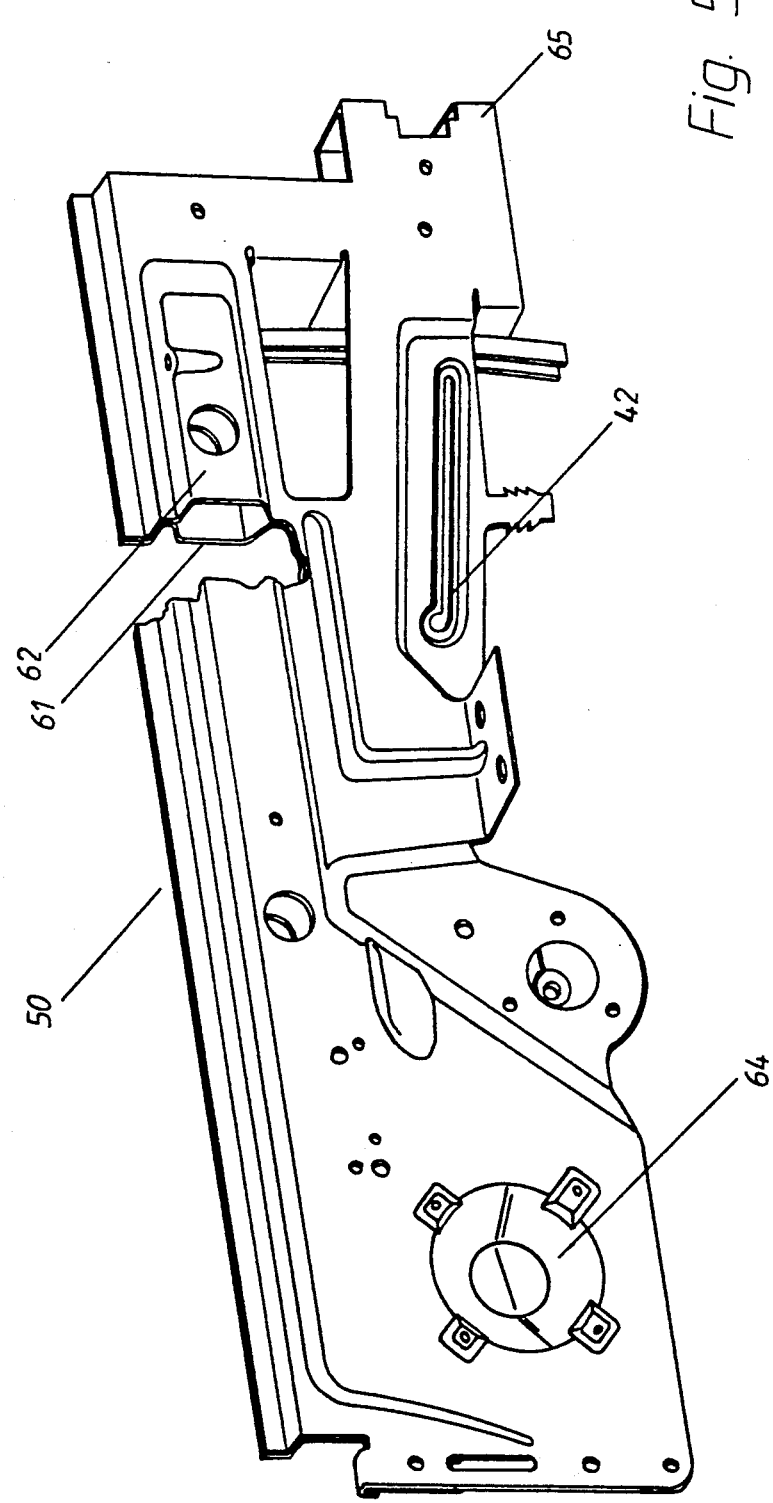
FIG. 5 is an illustration from an inside point of view of the core plate and box section of the hardware module.

The hardware module (50) is made of two parts as shown in FIG. 5, a core panel (62) and a inner belt line reinforcement member (61) which is spot welded to it. Both parts can be stamped from sheet steel. The inner belt reinforcement member (61) is box-sectioned to provide a lightweight but stiff structure along the inner belt line sufficient to pass appropriate crash tests. The core plate (62) is stamped to receive the hardware components in predetermined locations and appropriate fastening receptacles are provided. Without attempting to be exhaustive in this regard, for such methods are within the scope of the art, a slot (42) is provided as a guide for an X-arm of the window regulator (58), an interior release bracket (63) is provided for the interior release handle and associated mechanisms, a well (64) is provided to house a speaker for a radio or tape deck. A latch bracket (65) is provided to contain and support the latch mechanism (57) (not shown).

It can be seen, therefore, that the hardware module can be adapted to contain virtually all the door hardware. The door module can be pre-assembled and pretested before shipment to a manufacturer for installation.

The embodiment of the invention having an exterior door release (53) attached to the hardware module (50) by means of cables (54) can be installed from the interior of the door. This novel feature permits the complete assembly of the module (50) before shipment and installation in a car door without any preassembly of components on the assembly line. Moreover, the installation can be done at once from one side of the door and the fishing of rods and other components through panel holes and adjustment and calibration is eliminated or substantially reduced on the assembly line.

Figure 6:
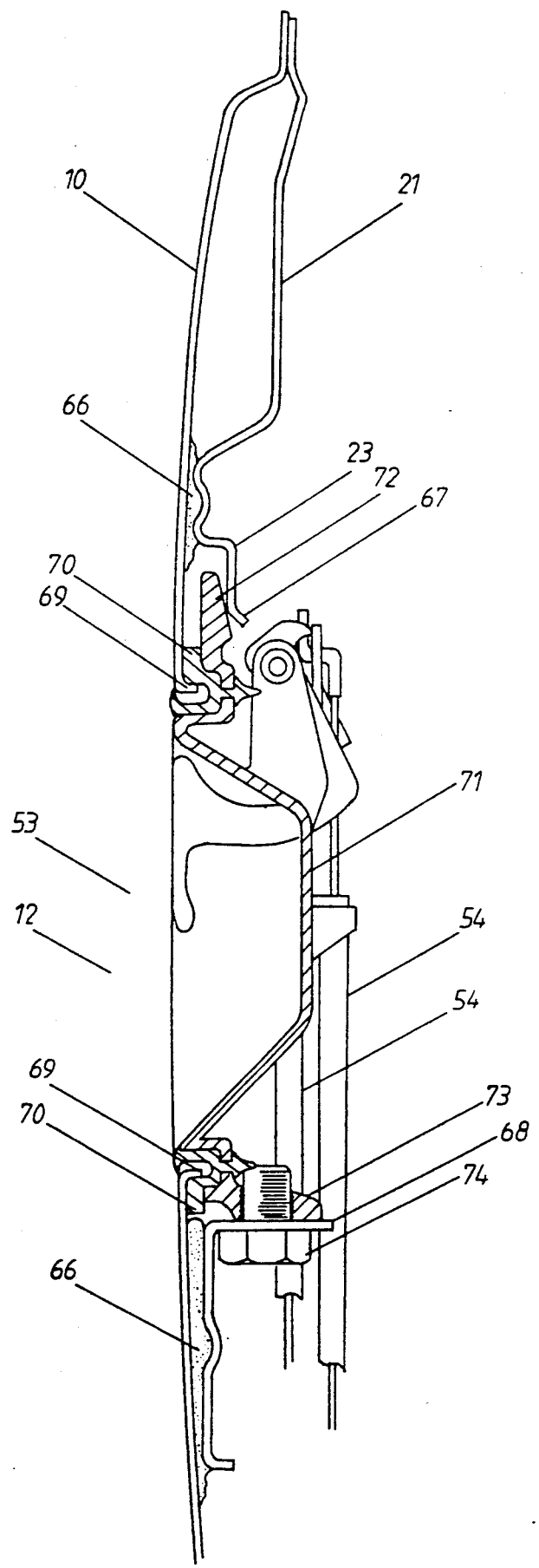
FIG. 6 is an illustration of the cable attached exterior door release installed in a door.
Figure 7:
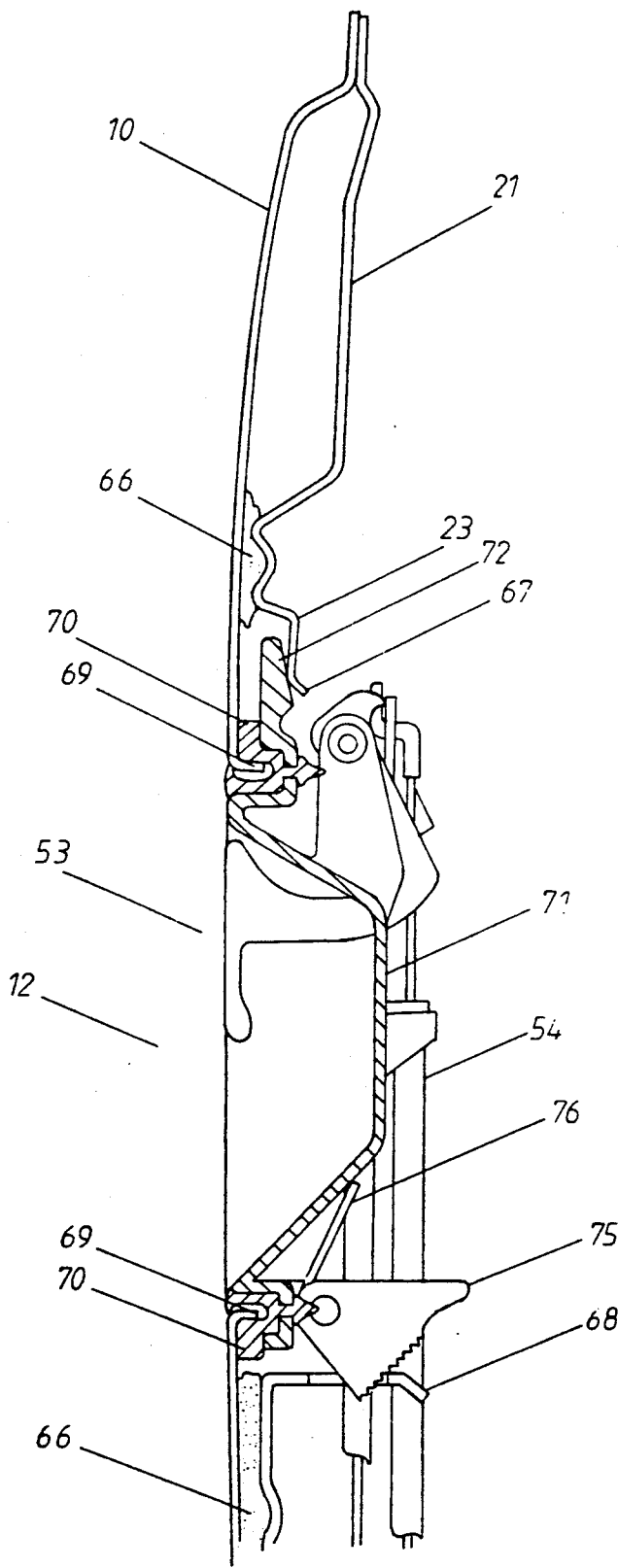
FIG. 7 is a side view of the ratchet embodiment of the exterior door release installation.
Figure 8:
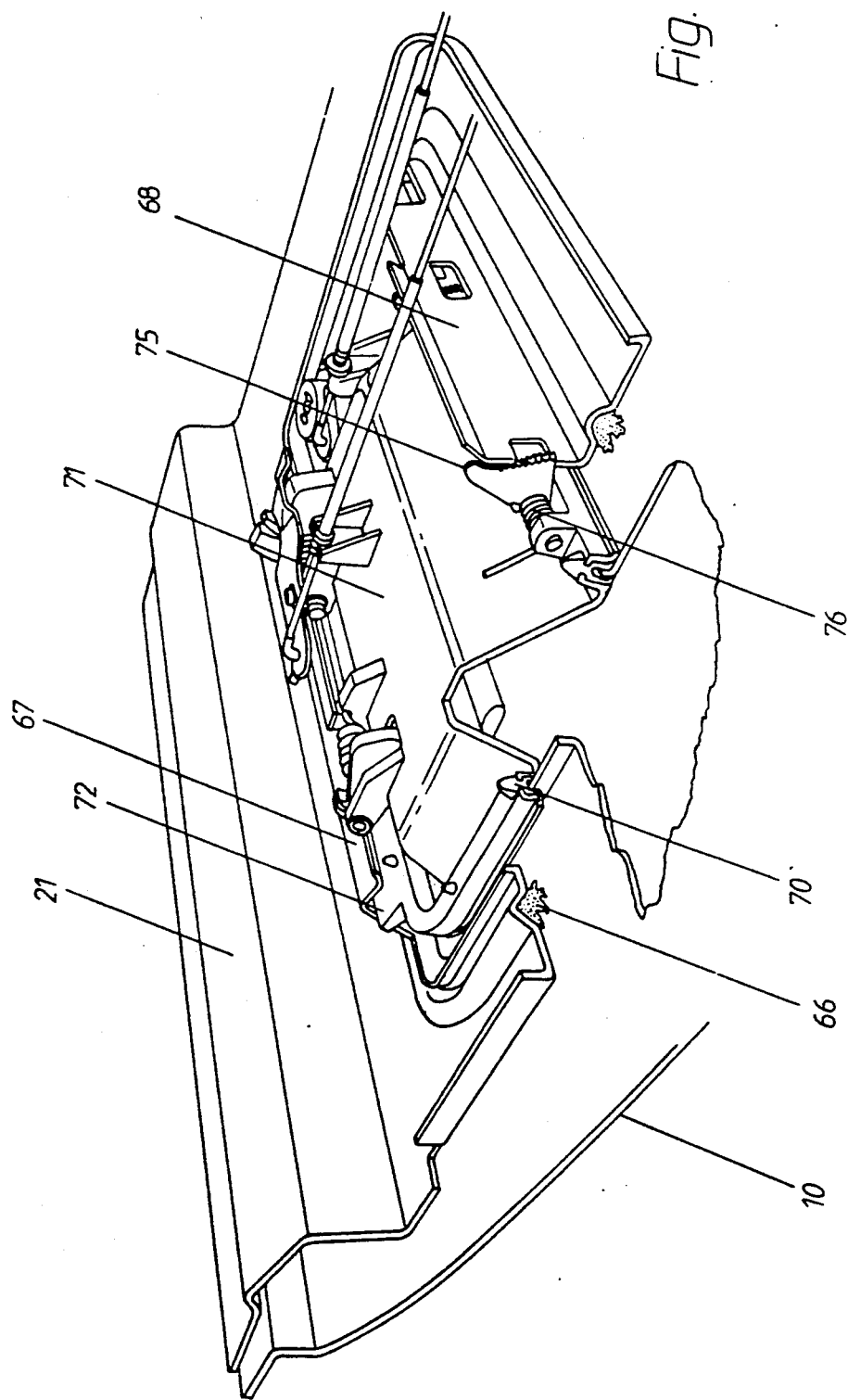
FIG. 8 is a perspective of the ratchet embodiment of FIG. 7.

The installation of the exterior door release (53) is shown in FIGS. 6, 7 and 8. It will be recalled that the outer belt reinforcement section (21) has a depending flange (23) which surrounds opening (12) in the outer panel (10). The flange (23) is bonded to the inside of outer panel (10) by a suitable bonding material (66) which preferably does not penetrate the outer panel, for example, an adhesive. Above opening (12), the flange (23) bends inwardly and downwardly to form a spring lip (67). Below the opening (12), the flange (23) bends inwardly to produce a ledge (68). About the edge of opening (12), the outer panel (10) is bent inwardly to form a stiffening lip (69). A rubber gasket (70) is adapted to fit over the stiffening lip (69) and to lie between the outer panel (10) and the housing (71) of the exterior release (53). The rubber gasket (70) has a groove which fits about the stiffening lip (69) and has sufficient depth to accommodate any reasonable tolerances in the dimensions of the stiffening lip (69). The rubber gasket (70) is also adapted to accommodate reasonable tolerances in the dimensions of the opening (12) and the housing (71) that fits into it. The housing (71) has a first projection (72) which spring fits under lip (67) of flange (23). The bottom of the housing (71) has a second projection (73) adapted to locate a fastener such as a bolt (74) (in FIG. 6) or a ratchet (75) (in FIGS. 7 and 8) biased by a spring (76).

In FIGS. 6, therefore, the exterior release is fitted under lip (67) of flange (23) and then bolted to ledge (68) of flange (23). In FIGS. 7 and 8, the exterior release is first fitted under lip (67) and then pushed over ledge (68) until ratchet (75) drops into an opening in ledge (68). The ratchet embodiment is very easy to install and easy to release for repair. Moreover, in use, vibration in the door will tend to seat the ratchet (75) under the force of biasing spring (76) and pulling on the exterior release (53) will also tend to seat the ratchet. Therefore, security of the fastening is improved with use.

Figure 9:
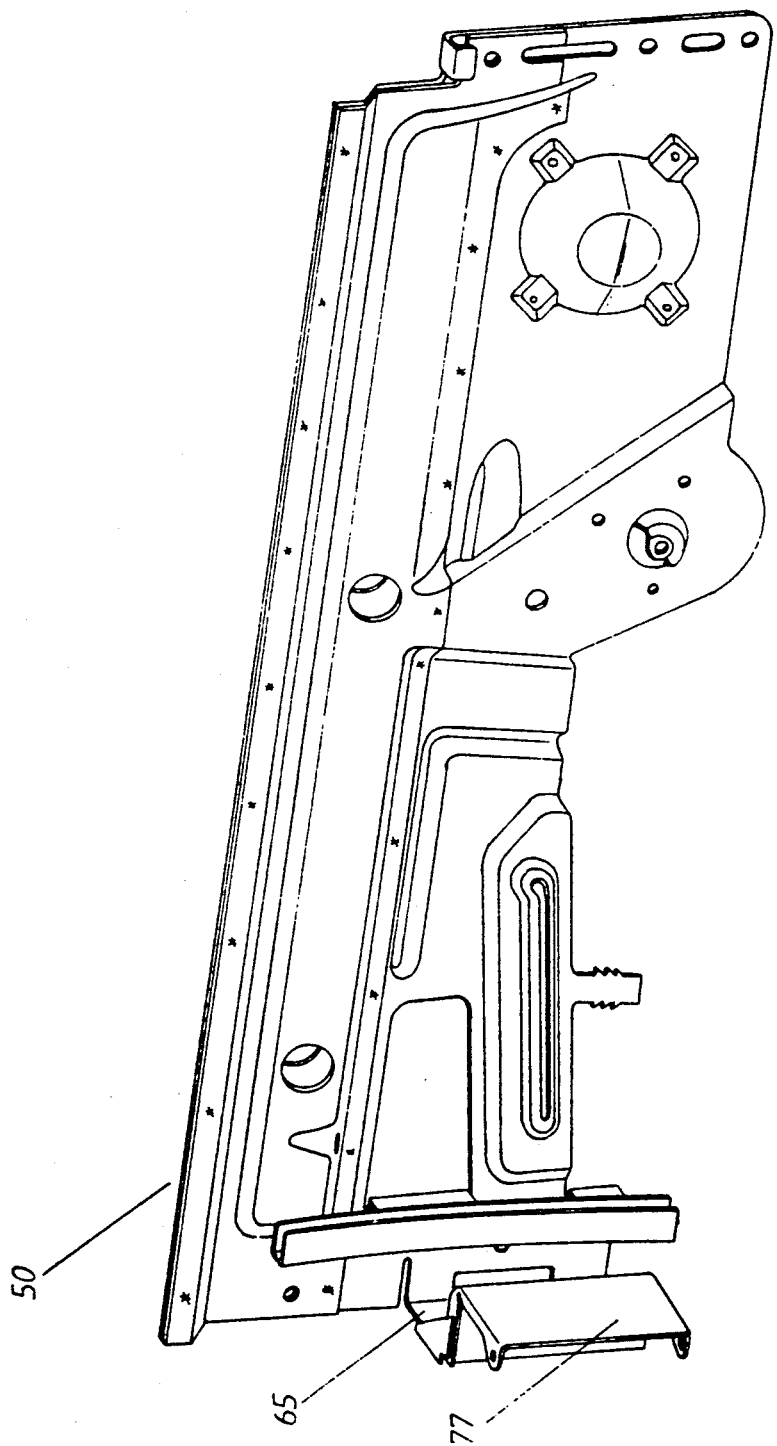
FIG. 9 is a drawing of a module adapted to receive with an integral exterior handle.
Figure 10:
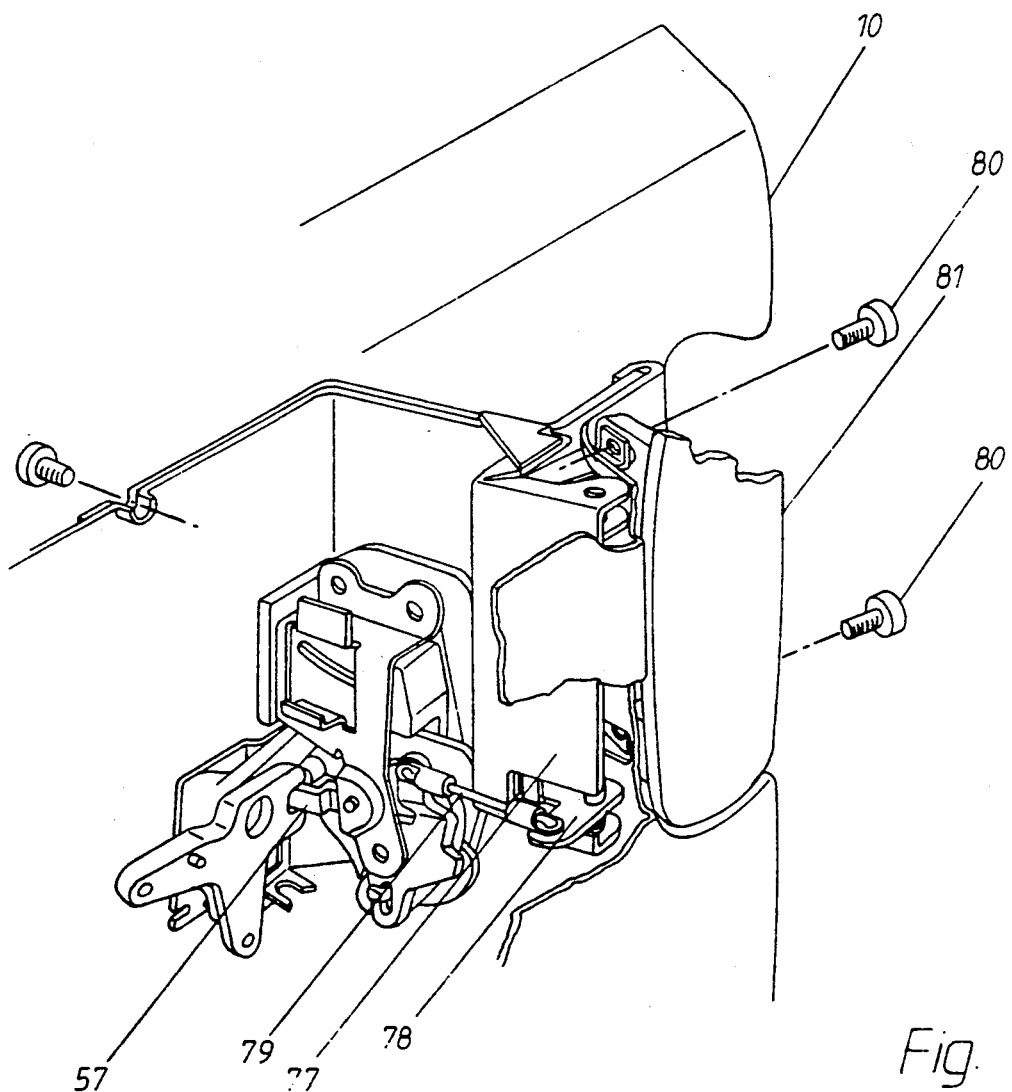
FIG. 10 is a sketch of a vertical flip-out handle mechanism integral to the module.

In another embodiment of the exterior release, shown in FIGS. 9 and 10, the exterior release (53) is integral to the module (50). As shown in FIG. 9 in this embodiment the module (50) is further adapted with a handle carrier (77) adjacent to the latch bracket (65). As shown in FIG. 10, the handle carrier (77) supports the handle mechanism (78) which can be connected to the latch mechanism (57) by rod (79). In this embodiment, the handle mechanism (78) can be installed with the hardware module (50). Following installation to the module (50), in one embodiment, a handle plate (81) can be installed from the outside after assembly of the door. In this mode, handle plates can be coordinated to the colour of the outer panel (10). Adjustments for tolerances can be made by installation of the handle plate (81) with bolts (80) that fit into oversized holes in the handle (81) and into holes in brackets in the handle mechanism (78). The handle plate (81) can be adjusted to be flush to the outer panel (10) and then bolted in place.

It will be appreciated by those skilled in the art that the means of this invention can be adapted to a variety of handles including flip-up, flip-out, suitcase and other conventional types.

It will also be appreciated that the lock cylinder receptacle would be installed with the exterior release mechanism. For example, in FIG. 4, the lock cylinder receptacle (56) is shown as part of the exterior release (53). One of the cables (54) is dedicated to the lock while the other is for the release mechanism. What is new about the lock mechanism of this invention is the fact that the lock cylinder can be installed after assembly of the door. As explained earlier, this avoids the necessity of ensuring that during line assembly of the door modules, each module in each car has a matching lock cylinder. This substantially reduces the shipping and handling concerns associated with the modules. The matching lock cylinders can be dealt with as a separate item.

Figure 11:
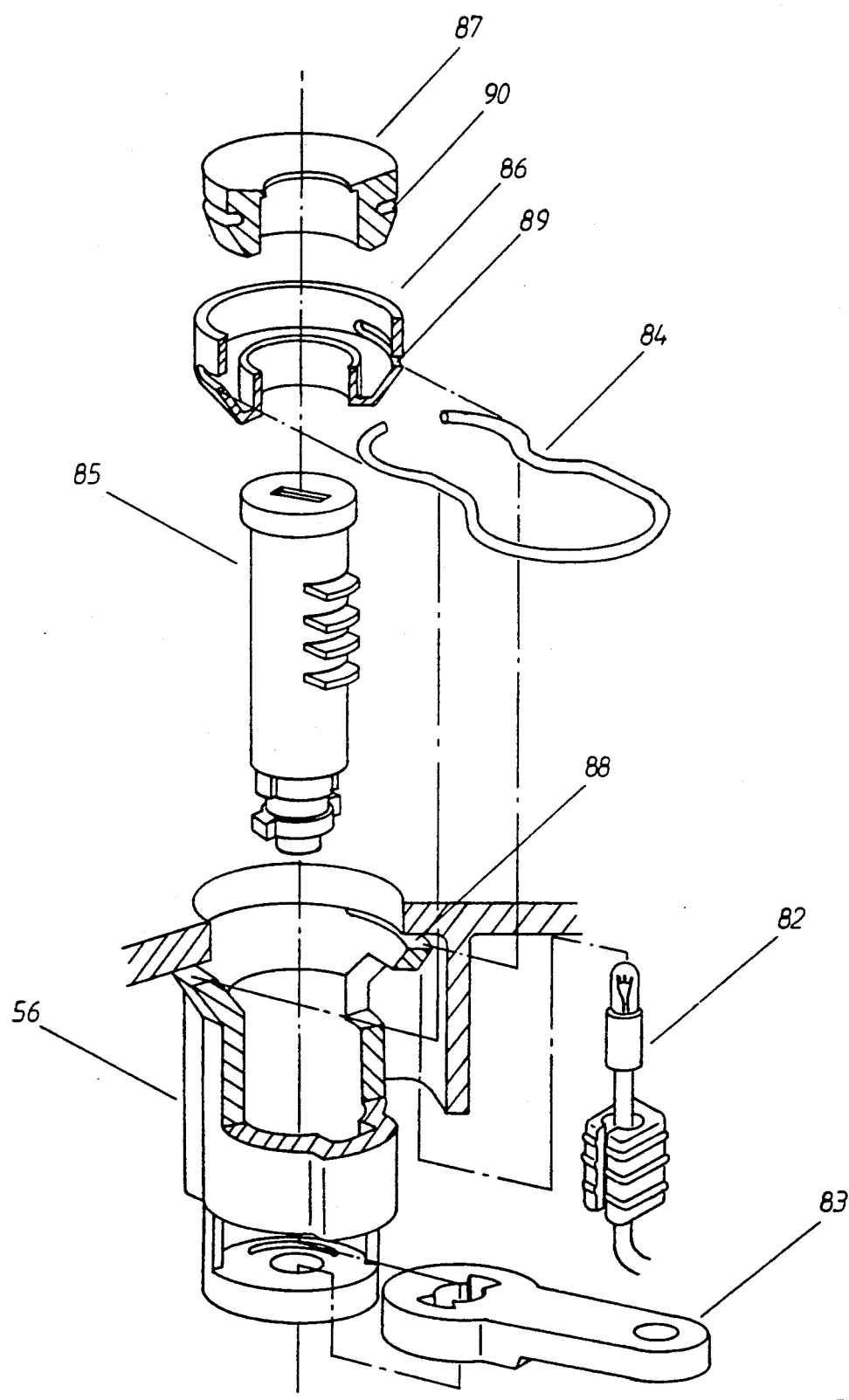
FIG. 11 is an exploded view of the lock cylinder mechanism.
Figure 12:
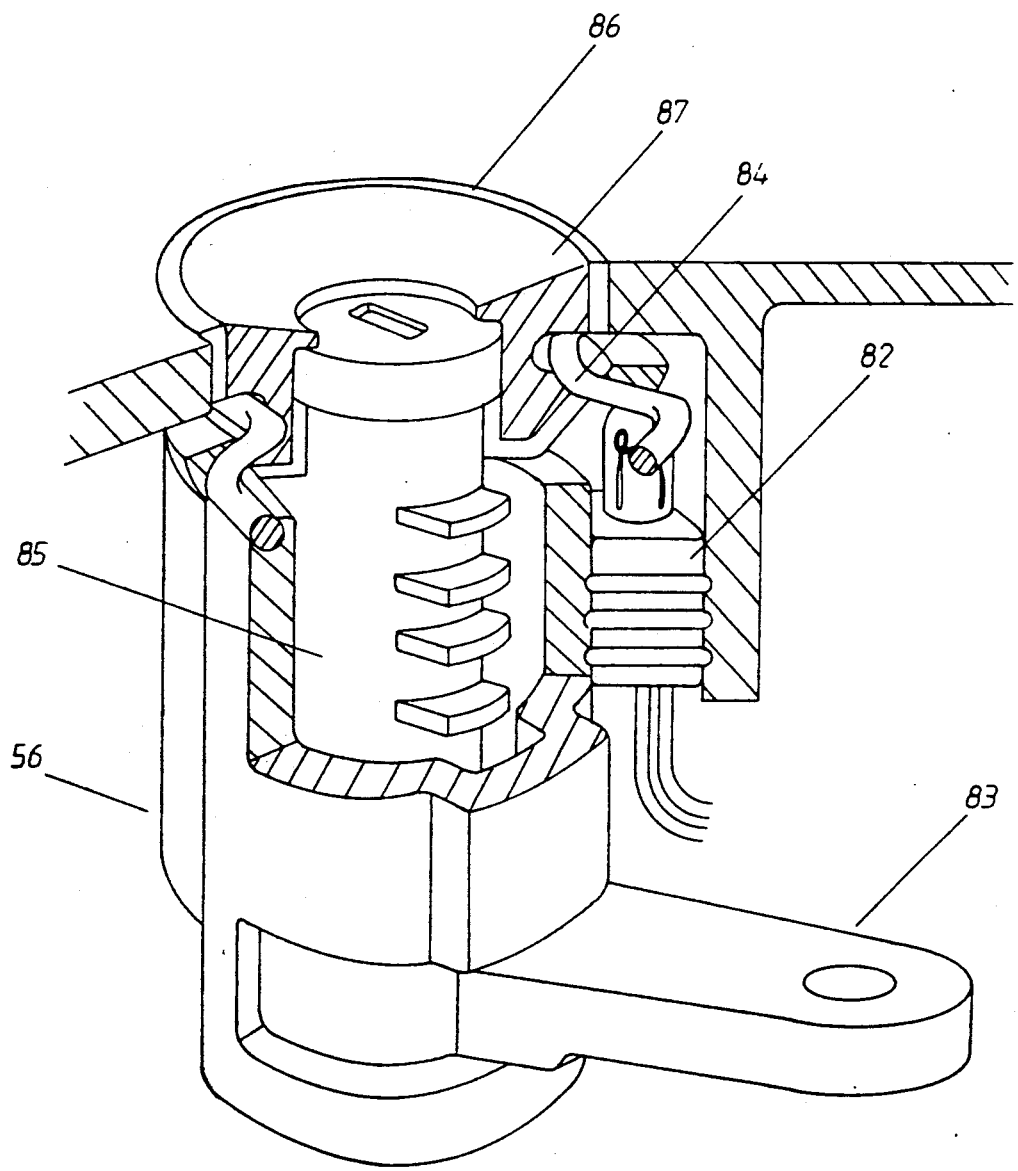
FIG. 12 is a cut-away view of the assembled lock cylinder.

The means for installing the locks after assembly is illustrated in FIG. 11 the lock cylinder receptacle (56), an illumination bulb (82), a molded plastic arm (83) and a spring clip retainer (84) are shown. .These elements would be preassembled in the receptacle (56) as part of the module (50). The lock cylinder (85), the illuminator ring (86) and the retainer cap (87) would be installed after the module (50) is assembled into the door. The retainer cap (87) would snap into the illuminator ring (86). The lock cylinder (85) would be pushed into the receptacle (56) and the retainer cap and illuminator ring assembly pushed in, over and about the lock cylinder (85). Spring clip retainer (84) is located in groove (88) and would snap fit into grooves (89) and (90) in the illuminator ring (86) and retainer cap (87) respectively. The assembled unit is displayed in FIG. 12.

In some embodiments of this invention, it has been desirable to provide separate "wet" and "dry" areas in the hardware module to segregate the components that do not tolerate water vapour from those that do. For example, electrical controls for power windows and door locks, the speaker for the radio and the interior door latch are items that have been identified as being components that should be inside the vapour barrier. To achieve this objective, a dry area is provided in the module similar to the speaker well (64) shown in FIG. 5, however this dry area is expanded to include other components and is fitted with means adapted to provide a vapour seal.

In FIG. 13, a dry area (100) is illustrated which contains the interior release (101). (See sections A-A and C—C), the electrical controls (102) (See section D—D) and a speaker (103) (See section E—E). The window regulator crank (104) or electrical motor (105) is left outside the dry area (100). (See section B—B).

Dry area (100) is surrounded by a sealing surface (106) which is adapted to receive either conventional polyethylene vapour barrier material (such as water shield (40)) or sealing means (107) located on the bezel (111). In either mode, the dry area (100) provides a vapour barrier and it is isolated from the other parts of the module (50) by sealing means (107). It is preferred that the sealing means (107) be located on the bezel (111), but it will be apparent that the sealing means could be located on the module (50) to seat on the bezel (111). The sealing means (107) might also be located on another portion of the trim panel.

The wiring harness (52) passes through a sealing grommet (not shown) as it exits the dry area (100).

In the preferred embodiment of the courtesy lamp of this invention, shown in FIG. 14, only the lens (150) and the reflector (151) are located in the trim panel (11). The bulb (152) and the socket (153) are separately mounted to the hardware module by a clip (154). To accommodate reasonable dimensional tolerances of the hardware module and the trim panel an oversized hole (155) is made in the back of the reflector through which the bulb (152) fits. A foam pad (156) with silver reflective material (157) on the bulb side is attached over the socket (153) to act as an anti-rattle padding and a dust and moisture seal between the socket (153) and the reflector (151) and lens (150).

The embodiments in which an exclusive property is claimed are as follows:

1. An automobile door comprising:
   a door shell comprising: an outer belt reinforcement member, an outer panel, an inner panel member including a hinge member, and a latch member;
   a module containing door hardware comprising: an inner belt reinforcement member; a core comprising two overlapping metal plates having receptables to receive the hardware components, each said plate having a partial box section inverted and opposed to the other to form the inner belt reinforcement member; the hardware components comprise an exterior door release an interior release; a latch mechanism; window regulator mechanism; and a trim panel;
   wherein the module is installed, from the inside, into the door shell and fastened therein to locate all the hardware components in the door.

2. An automobile door comprising:
   a door shell, comprising:
     an outer belt reinforcement member,
     an outer panel,
     an inner panel member including a hinge member, and
     a latch member; and
   a module containing door hardware, comprising:
     an inner belt reinforcement member,
     an exterior door release,
     an interior release,
     a latch mechanism,
     window regulator mechanism, and
     a trim panel;
   wherein the module is installed, from the inside, into the door shell and fastened therein to locate all the hardware components in the door;
   wherein the outer panel has an opening for receiving the exterior release and the outer panel is reinforced about the opening by a flange extending from the door shell, the flange providing a base upon which the exterior release is fastened;
   wherein the exterior release is contained in a housing, comprising:
     a first portion inserted under a first portion of the flange, a second portion fastened to a second portion of the flange to secure the exterior release in the opening;

an upward extension inserted under a depending lip of the flange; and an inward extension fastened onto an inward extending ledge of the flange to secure the exterior release in the opening;

wherein the module further comprises:

a downwardly biased ratchet cam rotatably mounted on the second portion of the housing, the cam being adapted to rotate into and to connect with an edge of an opening in the inward extending ledge of the flange to secure the exterior release in the opening.

3. An automobile door comprising:

a door shell, comprising:
   an outer belt reinforcement member,
   an outer panel,
   an inner panel member including a hinge member, and
   a latch member; and a module containing door hardware, comprising:
   an inner belt reinforcement member,
   an exterior door release,
   an interior release,
   a latch mechanism,
   window regulator mechanism, and
   a trim panel, wherein the module is installed, from the inside, into the door shell and fastened therein to locate all the hardware components in the door;

wherein the module further comprises:
   a core, comprising:
      two overlapping metal plates having adapted receptables to receive the hardware components, each said plate having a partial box section inserted and opposed to the other to form the inner belt reinforcement member;

wherein the exterior door release comprises:
   a separate exterior door release installed from inside the door shell and being connected by actuating cables to a latch mechanism mounted on the module;

wherein the outer panel has an opening for the exterior release and the outer panel is reinforced about the opening by a flange extending from the door shell, the outer panel being bent about the opening to form an inward extending rim, the rim being bounded by a gasket receiving the exterior release and to separate same from the outer panel, the flange providing a base upon which the exterior release is fastened, the exterior release being contained in a housing having an upward extension inserted under a depending lip of the flange and having a lower, inward extension fastened by a downwardly biased ratchet cam rotatably mounted thereon, the cam being adapted to rotate into and to connect with an edge of an opening in the inward extending ledge of the flange to secure the exterior release in the opening.

4. An automobile door, comprising:

a door shell, comprising:
   an outer belt reinforcement member,
   an outer panel,
   an inner panel member including a hinge member, and
   a latch member; and a module containing door hardware comprising:
   an inner belt reinforcement member,
   an exterior door release,
   an interior release,
   a latch mechanism,
   window regulator mechanism, and
   a trim panel;

wherein the module is installed, from the inside, into the door shell and fastened therein to locate all the hardware components in the door;

wherein the outer panel has an opening for receiving the exterior release and the outer panel is reinforced about the opening by a flange extending from the door shell, the flange providing a base upon which the exterior release is fastened;

wherein the exterior release is contained in a housing, comprising:
   a first portion inserted under a first portion of the flange;
   a second portion fastened to a second portion of the flange to secure the exterior release in the opening;
   an upward extension inserted under a depending lip of the flange; and
   an inward extension fastened to an inward extending ledge of the flange to secure the exterior release in the opening;

wherein the flange depends from the outer belt reinforcement member and is bonded to the inside of the outer panel about the opening for the exterior release.

5. An automobile door, comprising:

a door shell, comprising:
   an outer belt reinforcement member,
   an outer panel,
   an inner panel member including a hinge member, and
   a latch member; and a module containing door hardware comprising:
   an inner belt reinforcement member,
   an exterior door release,
   an interior release,
   a latch mechanism,
   window regulator mechanism, and
   a trim panel;

wherein the module is installed, from the inside, into the door shell and fastened therein to locate all the hardware components in the door;

wherein the outer panel has an opening for receiving the exterior release and the outer panel is reinforced about the opening by a flange extending from the door shell, the flange providing a base upon which the exterior release is fastened;

wherein the exterior release is contained in a housing, comprising:
   a first portion inserted under a first portion of the flange;
   a second portion fastened to a second portion of the flange to secure the exterior release in the opening;
   an upward extension inserted under a depending lip of the flange, and
   an inward extension fastened onto an inward extending ledge of the flange to secure the exterior release in the opening;

wherein the outer panel has an opening for the exterior release and is bent about the opening to form an inward extending rim, the rim being bounded by a gasket receiving the exterior release and to separate same from the outer panel, wherein the outer belt reinforcement member has a depending flange bonded to the inside of the outer panel about the opening for the exterior release, the flange providing a base upon which the exterior release can be fastened, and wherein the module has a core, comprising:

two overlapping metal plates, each such pate having a partial box section inverted and opposed to the other to form an inner belt reinforcement member, wherein the core contains receptacles to receive all door hardware including;

the exterior door release installed from inside the door shell and being connected by actuating cables to the latch mechanism mounted on the module, the exterior release being contained in a housing having an upward extension inserted under a depending lip of the flange and having a lower, inward extension fastened by a downward biased ratchet cam rotatably mounted thereon, the cam rotating into and connecting with an opening in the inward extending ledge of the flange to secure the exterior release in the opening, the module being installed, from the inside, into the door shell and fastened therein to locate all the hardware components in the door.

6. An automobile door comprising: a door shell comprising: an outer belt reinforcement member; an outer panel; an inner panel member including a hinge member; and a latch member;

a module containing door hardware comprising: an inner belt reinforcement member; a latch mechanism; a separate exterior door release, installed from inside the door shell and being connected by actuating cables to said latch mechanism mounted on the module; an interior release; window regulator mechanism; and a trim panel;

wherein the module is installed, from the inside, into the door shell and fastened therein to locate all the hardware components in the door.

7. An automobile door comprising: a door shell comprising: an outer belt reinforcement member; an outer panel, having an opening receive the exterior release and the outer panel is reinforced about the opening by a flange extending from the door shell, the flange providing a base upon which the exterior release is fastened;

an inner panel member including a hinge member; and a latch member;

a module containing door hardware comprising: an inner belt reinforcement member; an exterior door release; an interior release; a latch mechanism; window regulator mechanism; and a trim panel;

wherein the module is installed, from the inside, into the door shell and fastened therein to locate all the hardware components in the door.

8. The apparatus of claim 7 in which the exterior release is contained in a housing comprising:

a first portion inserted under a first portion of the flange, and a second portion fastened to a second portion of the flange to secure the exterior release in the opening.

9. The apparatus of claim 8 in which the housing further comprises:

an upward extension inserted under a depending lip of the flange, and an inward extension fastened onto an inward extending ledge of the flange to secure the exterior release in the opening.

10. An automobile door comprising: a door shell comprising: an outer belt reinforcement member; an outer panel; an inner panel member including a hinge member; and a latch member;

a module containing door hardware comprising: an inner belt reinforcement member; an exterior door release; an interior release; a latch mechanism; window regulator mechanism; a trim panel; a receptacle surrounded by a first sealing surface; and a sealing membrane fitted to the first sealing surface and a second sealing surface of an inner panel of the door shell substantially to prevent transmission of water vapor from the door shell into the receptacle while allowing communication between the interior of the automobile and the receptacle through trim panel means; said receptacle housing components of the module which are susceptible to damage from exposure is water vapor;

wherein the module is installed, from the inside, into the door shell and fastened therein to locate all the hardware components in the door.

11. An automobile door comprising: a door shell comprising: an outer belt reinforcement member; an outer panel; an inner panel member including a hinge member; and a latch member;

a module containing door hardware comprising: an inner belt reinforcement member; an exterior door release; an interior release; a latch mechanism; window regulator mechanism; a receptacle surrounded by a first sealing surface; a trim panel fitted to the first sealing surface of the receptacle and a second sealing surface of an inner panel of the door shell substantially to prevent transmission of water vapor from the door shell into the receptacle; and a bezel fitted over the receptacle to permit communication between the interior of the automobile and the receptacle through the bezel, said receptacle being adapted to house components of the module which are susceptible to damage from exposure to water vapor;

wherein the module is installed, from the inside, into the door shell and fastened therein to locate all the hardware components in the door.

12. An automobile door comprising: a door shell comprising: an outer belt reinforcement member; an outer panel; an inner panel member including a hinge member; and a latch member;

a module containing door hardware comprising: an inner belt reinforcement member; an exterior door release; an interior release; a latch mechanism; window regulator mechanism; a trim panel, comprising a lens and a reflector of a courtesy lamp; a bulb; and a socket mounted in the hardware module, said lens and reflector fitting over the bulb and socket as the trim panel is assembled onto the door shell;

wherein the module is installed, from the inside, into the door shell and fastened therein to locate all the hardware components in the door.

13. The automobile door of claim 12 having an over sized hole in the reflector receiving the bulb and accommodating reasonable dimensional tolerances of the hardware module and the trim panel, wherein the door further comprises:

a resilient pad located about the bulb on the socket with reflective material on the bulb side abutting against the inside surface of the reflector to reduce the intrusion of dust and moisture into the courtesy lamp.

* * * * *